Patented Apr. 12, 1938

2,114,012

UNITED STATES PATENT OFFICE 2,114,012

AROMATIC MERCURY ALCOHOLATES OF SALTS OF HYDROXY CARBOXYLIC ACIDS

Carl N. Andersen, Wellesley Hills, Mass., assignor to Lever Brothers Company, a corporation of Maine No Drawing. Application June 12, 1935, Serial No. 26,248

17 Claims. (Cl. 260—13)

The present invention relates to the production of aromatic mercury alcoholates of salts of hydroxy carboxylic acids.

It is an object of my invention to produce new organic mercury compounds useful as germicides and for other therapeutic purposes.

I have discovered that when the hydrogen atom of a hydroxyl group in a salt of a hydroxy acid is replaced by the essential radical of certain aromatic mercury compounds, compounds are produced which have extraordinarily high potency as antiseptics and germicides and at the same time are characterized by relatively low toxicity and other desirable properties.

The compounds I have prepared may be described as having the general formula $(RHg)_xR_1$, in which R represents an aromatic structure to a carbon atom of which the mercury is directly attached; in which $x$ represents the number of RHg groups in the compound, which may be one or more; and in which $R_1$ represents a radical corresponding to a salt of an aliphatic or aromatic hydroxy acid that is linked to the RHg group or groups through the replacement of a hydrogen atom of one or more hydroxy groups. While the words "group" and "groups" are used hereinafter it is to be understood that these words must be interpreted as singular or plural depending on the value of $x$.

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as for example, polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl, and naphthyl groups.

In my applications Serial Nos. 694,202 and 694,207, filed October 18, 1933, I have shown that when a compound containing both the COOH and OH groups is reacted with an aromatic mercury compound containing the above described radical, $R_1$ for example, the hydroxide or a soluble salt, the aromatic mercury radical replaces the hydrogen of the COOH group to form aromatic mercury salts. I have now discovered that when the hydrogen of the COOH group in these compounds is replaced by a metal to form a salt, and this salt is reacted with an aromatic mercury compound of the above defined type, the aromatic mercury radical R will replace the hydrogen of the OH group to form an aromatic mercury alcoholate.

The radical $R_1$ is an alcoholate radical of a salt of an aliphatic or an aromatic hydroxy acid. The acid may be mono or polybasic; if it is polybasic the hydrogen of all of the COOH groups would be replaced by a metal or positive radical. The salt may contain one or more OH groups. If it contains a plurality, the hydrogen of one or more of the OH groups may be replaced by the aromatic mercury radical to form mono- or poly-alcoholates respectively. Any metal or positive radical may be substituted in the carboxyl group. If an alkali metal is substituted, the compound, in general, is rendered more soluble and for many purposes this is desirable. Bismuth and antimony are also particularly desirable as substituents in the carboxyl group because these metals often impart desirable properties to the compounds.

The following examples are illustrative of the types of compounds falling within the above defined class: alcoholate of sodium salicylate, $RHgO \cdot C_6H_4 \cdot COONa$; alcoholate of potassium lactate, $CH_3 \cdot CHOHgR \cdot COOK$; alcoholate of sodium lactate $CH_3 \cdot CHOHgR \cdot COONa$; mono-alcoholate of sodium tartrate $Na \cdot OOC \cdot CHOH \cdot CHOHgR \cdot COONa$;

alcoholate of sodium citrate, $COONaCH_2 \cdot COONaCOHgR \cdot CH_2COONa$;

tri-alcoholate of bismuth salicylate $(RHgO \cdot C_6H_4 \cdot COO)_3Bi$;

tri-alcoholate of bismuth tartrate, $(C_4H_3O_6HgR)_3Bi_2$;

alcoholate of bismuth ammonium citrate, $(BiO)(NH_4)C_6H_5O_7HgR$;

monoalcoholate of bismuth lactate, $(CH_3CHOH \cdot COO)_2(CH_3 \cdot CHOHgR \cdot COO)Bi$;

alcoholate of bismuth tannate; mono-alcoholate of potassium antimonyl tartrate, $COOK \cdot CHOHgR \cdot CHOH \cdot COO(SbO) \cdot \frac{1}{2}H_2O$;

alcoholate of sodium malate, $COONa \cdot CHOHgR \cdot CH_2 \cdot COONa$;

tri-alcoholate of sodium gallate, $COONa \cdot C_6H_2 \cdot (OHgR)_3$;

alcoholate of para-hydroxy sodium benzoate,

COONa·C₆H₄·OHgR;
alcoholate of hydroxy sodium naphthoate,
COONa·C₁₀H₆·OHgR;
di-alcoholate of sodium glycerate,
COONa·CHOHgR·CH₂OHgR;
alcoholate of sodium glycollate,
RHgO·CH₂·COONa;
and di-alcoholate of di-hydroxy sodium stearate,
C₁₇H₃₃(OHgR)COONa.

I have prepared all of the above noted organic mercury alcoholates. These compounds together with others I have investigated comprise a sufficiently representative number of the class to lead me to believe that aromatic mercury alcoholates corresponding to all the salts of these types can be prepared. The compounds so prepared have greater or lesser, but always in relative high degree, desirable antiseptic and germicidal properties. I, therefore, regard my invention as generic to and including the entire group of aromatic mercury alcoholates of salts of hydroxy acids of the above defined type.

The general method of producing these compounds consists in reacting together the salt of the hydroxy acid and a compound containing an aromatic mercury radical of the above mentioned type. A common solvent for both reacting components is employed. The compound resulting from the reaction in some instances is relatively insoluble as compared to the reacting components and upon its precipitation it may be filtered, washed and dried. If the compound is not relatively insoluble the reaction mixture may be concentrated by evaporation to precipitate the compound.

The aromatic mercury compound I prefer to use for reacting with the salts of hydroxy acids is the hydroxide. This compound has the advantage that water is the only other product of the reaction and the resulting compound is, therefore, easily purified. I may also employ a soluble aromatic mercury salt, for example, the acetate or the lactate, in the reaction with the salt of the hydroxy acid. The aromatic mercury alcoholates produced are generally of low solubility as compared with the aromatic mercury salt and are relatively insoluble as compared with the salt of the hydroxy acid.

The following examples are given as illustrative of the process by which all the compounds of this group may be prepared and as illustrative and representative of organic mercury alcoholates falling within the scope of my invention:

Example 1

17.64 grams of phenylmercury hydroxide is dissolved in two liters of water and heated until solution is complete. The solution is filtered to remove any insoluble or foreign material. To the filtrate is added 9.6 grams of sodium salicylate dissolved in 50 cc. of water. The mixture is filtered and concentrated to about 400 cc. and again filtered while hot and allowed to cool. A white precipitate settles out on cooling. The mixture is filtered and the precipitate is washed well with warm water and alcohol, and dried. The resulting material melts at 162–168° C. and is the phenylmercury alcoholate of sodium salicylate.

Example 2

17.64 grams of phenylmercury hydroxide are dissolved in one liter of water and heated until solution is complete. The solution is then filtered to remove any insoluble material. To the filtrate is added 7.68 grams of potassium lactate dissolved in 100 cc. of water. No precipitate results and the solution is filtered and concentrated to a smaller volume. When the solution is cooled, crystals separate, which are removed by filtration, washed and dried. Upon recrystallization of the material from alcohol it sinters at 196° C. and melts to an opaque mass at 208–210° C. It is the phenylmercury alcoholate of potassium lactate.

Example 3

35.28 grams of phenylmercury hydroxide are dissolved in one and one-half liters of water and heated until solution is complete. The solution is filtered to remove any insoluble material. To the filtrate is added 42.84 grams of sodium citrate dissolved in 200 cc. of water. The solution is concentrated to one-half its volume and an abundant yield of crystals separate. These are removed by filtration, washed and dried. Upon recrystallization from alcohol the material sinters at 212° C. and melts to an opaque mass at 217–218° C. It is the phenylmercury alcoholate of sodium citrate.

Example 4

10.08 grams of phenylmercury acetate are dissolved in 500 cc. of water and heated until solution is complete. The solution is filtered to remove any insoluble material. To the filtrate is added 17.44 grams of bismuth salicylate suspended in 500 cc. of alcohol. This is added to the phenylmercury acetate solution and the resulting solution evaporated to one-half its original volume and allowed to cool. A crystalline material separates which is removed by filtration, and dried. The resulting material melts at 153–154° C. and is the tri-phenylmercury alcoholate of bismuth salicylate.

Example 5

17.64 grams of phenylmercury hydroxide are dissolved in one liter of alcohol and heated until solution is complete. The solution is then filtered to remove any insoluble material. To the filtrate is added 21.16 grams of bismuth lactate suspended in 500 cc. of alcohol. The mixture is heated for a short time and then allowed to cool. A precipitate forms, which is separated by filtration, washed with alcohol and dried. Upon heating the material it darkens at 185° C. and blackens at 230–235° C. with decomposition. It is the phenylmercury alcoholate of bismuth lactate.

Example 6

17.64 grams of phenylmercury hydroxide are dissolved in one liter of water and heated until solution is complete. The solution is filtered to remove any insoluble material. To the filtrate is added 19.22 grams of antimony potassium tartrate (tartar emetic) dissolved in 100 cc. of water. A white precipitate forms immediately and the mixture is heated for a few minutes after which it is allowed to cool. The precipitate is separated by filtration, washed and dried. Upon being recrystallized from alcohol it does not melt up to 280° C. but decomposition becomes apparent at this point. It is the mono-phenylmercury alcoholate of antimony potassium tartrate.

Example 7

52.92 grams of phenylmercury hydroxide are dissolved in two liters of water and heated until solution is completed. The solution is filtered to remove any insoluble material. To the filtrate is added a solution of sodium gallate which has been prepared by a neutralization of 11.28 grams of gallic acid in water with an aqueous solution of 2.4 grams of sodium hydroxide. A light green precipitate forms and the mixture is heated for a few minutes and allowed to cool. The precipitate is separated by filtration, washed well with water and alcohol and dried. Upon recrystallization from alcohol, a white powdery crystalline material is obtained which melts at 116–117° C. at which point decomposition sets in. It is the tri-phenylmercury alcoholate of sodium gallate.

*Example 8*

11.28 grams of 3-hydroxy,2-naphthoic acid are dissolved in 100 cc. of alcohol and neutralized with 2.4 grams of sodium hydroxide in 50 cc. of water to form hydroxy sodium naphthalate. In a separate container 17.46 grams of phenylmercury hydroxide is dissolved in one liter of water and heated until solution is complete. The solution is filtered to remove any insoluble material. To this filtrate is then added the solution of hydroxy sodium naphthoate. The solution is evaporated to one-half its volume and allowed to cool. A small yield of crystals separates which are removed by filtration, washed with water and a few cc. of alcohol and dried. The material sinters at 153° C. and melts at 200–210° C. It is the phenylmercury alcoholate of hydroxy sodium naphthoate.

*Example 9*

58.8 grams of phenylmercury hydroxide are dissolved in two liters of water and heated until solution is complete. The solution is filtered to remove any insoluble material. In a separate container 32.8 grams of di-hydroxy stearic acid is suspended into 200 cc. of water and treated with 4 grams of sodium hydroxide dissolved in 50 cc. of water to form di-hydroxy sodium stearate. This solution is added to the phenylmercury hydroxide solution and a precipitate results. The mixture is heated for a short time to insure completion of the reaction and is then allowed to cool. The precipitate is separated by filtration, washed well with water and a few cc. of alcohol and dried. Upon recrystallization from alcohol the material melts at 139–139.5° C. It is di(phenylmercury) alcoholate of di-hydroxy sodium stearate.

The reacting materials are employed in substantially theoretical quantities. In cases where it is desired to replace the hydrogen of more than one hydroxyl group correspondingly larger quantities of the aromatic mercury compound will be required. If it is desired, in some instances, 10% excess of the salt may be employed in order to insure the complete conversion of the phenylmercury compound, particularly in instances where the salt is readily soluble.

Any suitable solvent in which the reacting components are soluble may be used for carrying out the reaction. If they are both soluble in water this is generally used for reasons of convenience but if not, other solvents, such as the alcohols or acetone or mixtures of these with each other or with water, may be employed. The process may be carried out at any temperature, for example, room temperature. In most cases I find, however, that the use of heat facilitates the solution of the reacting components and speeds the reaction.

From the description of the specific examples it will be readily apparent to one skilled in the art how the other members of the group of salts of hydroxy acids may be reacted with aromatic mercury compounds to produce aromatic mercury alcoholates of analogous structure.

All of the compounds produced as above described are characterized by extraordinarily high potency as germicides. Tests to determine the efficacy of some of them in killing B. typhosus and Staph. aureus were carried out under the following conditions.

Aqueous solutions of varying dilutions from 1:10,000 upward until killing ceased, were made up.

These dilutions were employed in the conduct of the tests by the following methods:

Circular 198, U. S. Dept. of Agriculture, Dec. 1931, described as F. D. A. method against *Eberthella typhi* (typhoid bacillus) at 37° C. and F. D. A. special method against *Staph. aureus* at 37° C.

As illustrative of the potency of the compounds, the killing power of the following is given merely as illustrative. The figures represent the maximum dilutions at which killing in 15 minutes resulted:

|  | B. typhosus | Staph. aureus |
| --- | --- | --- |
| Phenylmercury alcoholate of sodium salicylate | 1:140,000 | 1:50,000 |
| Phenylmercury alcoholate of potassium lactate | 1:84,000 | 1:48,000 |
| Phenylmercury alcoholate of potassium malate | 1:70,000 | 1:40,000 |

In addition to their high germicidal value, these compounds are characterized by relatively low toxicity. Because of these properties it is possible to use them in extreme dilutions and in many situations where known germicides, because of toxic or other undesired properties, cannot be employed. They may be used externally and locally, and in some cases administered internally with satisfactory results from the germicidal standpoint and without harmful effect to the body or its functions.

The compounds retain their germicidal activity when incorporated in soap and various menstrums employed in preparing germicidal compositions.

When these new compounds are to be used directly as germicides they may be employed in aqueous or other solutions or they may be formed into various preparations such as mouth washes, tooth pastes, soaps, ointments, etc.

I claim:

1. A new aromatic mercury alcoholate having the general formula (RHg)$_x$R$_1$, in which R represents an aromatic structure to a carbon atom of which the mercury is directly attached, and in which none of the carbon atoms has direct linkage with any element other than hydrogen, carbon and mercury; in which R$_1$ represents a radical of an alkali-metal salt of a poly-hydroxy aliphatic carboxylic acid, which radical is linked to the RHg group by replacement of a hydrogen of an OH group, and in which $x$ represents the number of RHg groups in the compound, and is an integer of at least one and not more than the number of OH groups in said salt.

2. A new aromatic mercury alcoholate having the general formula (RHg)$_x$R$_1$, in which R represents an aromatic structure to a carbon atom of which the mercury is directly attached, and in which none of the carbon atoms has direct linkage with any element other than hydrogen, carbon and mercury; in which $R_1$ represents a radical of an alkali metal salt of a poly-hydroxy monobasic carboxylic acid which radical is linked to the RHg group by replacement of a hydrogen of an OH group, and in which $x$ represents the number of RHg groups in the compound, and is an integer of at least one and not more than the number of OH groups in said salt.

3. A new aromatic mercury alcoholate having the general formula $RHgR_1$, in which R represents an aromatic structure to a carbon atom of which the mercury is directly attached, and in which none of the carbon atoms has direct linkage with any element other than hydrogen, carbon and mercury; and in which $R_1$ represents a radical of an alkali-metal salt of a mono-hydroxy aromatic carboxylic acid, which radical is linked to the RHg group by replacement of a hydrogen of the OH group.

4. A new phenylmercury alcoholate having the general formula $(C_6H_5Hg)_xR_1$, in which $R_1$ represents a radical of an alkali-metal salt in a polyhydroxy aliphatic carboxylic acid, which radical is linked to the $C_6H_5Hg$ group by replacement of a hydrogen of an OH group, and in which $x$ represents the number of $C_6H_5Hg$ groups in the compound, and is an integer of at least one and not more than the number of OH groups in said salt.

5. A new phenylmercury alcoholate having the general formula $(C_6H_5Hg)_xR_1$, in which $R_1$ represents a radical of an alkali-metal salt of a polyhydroxy mono-basic carboxylic acid, which radical is linked to the $C_6H_5Hg$ group by replacement of a hydrogen of an OH group, and in which $x$ represents the number of $C_6H_5Hg$ groups in the compound, and is an integer of at least one and not more than the number of OH groups in said salt.

6. A new phenylmercury alcoholate having the general formula $C_6H_5HgR_1$, in which $R_1$ represents a radical of an alkali-metal salt of a mono-hydroxy aromatic carboxylic acid which radical is linked to the $C_6H_5Hg$ group by replacement of the hydrogen of the OH group.

7. Phenylmercury alcoholate of potassium lactate.

8. Phenylmercury alcoholate of sodium salicylate.

9. Diphenylmercury alcoholate of dihydroxy sodium stearate.

10. A new aromatic mercury alcoholate having the general formula $(RHg)_xR_1$, in which R represents an aromatic structure to a carbon atom of which the mercury is directly attached, and in which none of the carbon atoms has direct linkage with any element other than hydrogen, carbon and mercury; in which $R_1$ represents a radical of an alkali-metal salt of a hydroxy carboxylic acid, which radical is linked to the RHg group by replacement of hydrogen of the OH group; and in which $x$ represents the number of RHg groups in the compound and is an integer of at least one and not more than the number of OH groups in said salt.

11. A new aromatic mercury alcoholate having the general formula $(RHg)_xR_1$, in which R represents an aromatic structure to a carbon atom of which the mercury is directly attached, and in which none of the carbon atoms has direct linkage with any element other than hydrogen, carbon and mercury; in which $R_1$ represents a radical of an alkali-metal salt of an aliphatic hydroxy carboxylic acid, which radical is linked to the RHg group by replacement of hydrogen of the OH group; and in which $x$ represents the number of RHg groups in the compound and is an integer of at least one and not more than the number of OH groups in said salt.

12. A new aromatic mercury alcoholate having the general formula $(RHg)_xR_1$, in which R represents an aromatic structure to a carbon atom of which the mercury is directly attached, and in which none of the carbon atoms has direct linkage with any element other than hydrogen, carbon and mercury; in which $R_1$ represents a radical of an alkali-metal salt of an aromatic hydroxy carboxylic acid, which radical is linked to the RHg group by replacement of hydrogen of the OH group; and in which $x$ represents the number of RHg groups in the compound and is an integer of at least one and not more than the number of OH groups in said salt.

13. A new aromatic mercury alcoholate having the general formula $(RHg)_xR_1$, in which R represents an aromatic structure to a carbon atom of which the mercury is directly attached, and in which none of the carbon atoms has direct linkage with any element other than hydrogen, carbon and mercury; in which $R_1$ represents a radical of an alkali-metal salt of a hydroxy monobasic carboxylic acid, which radical is linked to the RHg group by replacement of hydrogen of the OH group; and in which $x$ represents the number of RHg groups in the compound and is an integer of at least one and not more than the number of OH groups in said salt.

14. A new phenylmercury alcoholate having the general formula $(C_6H_5Hg)_xR_1$, in which $R_1$ represents a radical of an alkali-metal salt of a hydroxy carboxylic acid, which radical is linked to the $C_6H_5Hg$ group by replacement of hydrogen of the OH group; and in which $x$ represents the number of $C_6H_5Hg$ groups in the compound and is an integer of at least one and not more than the number of OH groups in said salt.

15. A new phenylmercury alcoholate having the general formula $(C_6H_5Hg)_xR_1$, in which $R_1$ represents a radical of an alkali-metal salt of an aliphatic hydroxy carboxylic acid, which radical is linked to the $C_6H_5Hg$ group by replacement of hydrogen of the OH group; and in which $x$ represents the number of $C_6H_5Hg$ groups in the compound and is an integer of at least one and not more than the number of OH groups in said salt.

16. A new phenylmercury alcoholate having the general formula $(C_6H_5Hg)_xR_1$, in which $R_1$ represents a radical of an alkali-metal salt of an aromatic hydroxy carboxylic acid, which radical is linked to the $C_6H_5Hg$ group by replacement of hydrogen of the OH group; and in which $x$ represents the number of $C_6H_5Hg$ groups in the compound and is an integer of at least one and not more than the number of OH groups in said salt.

17. A new phenylmercury alcoholate having the general formula $(C_6H_5Hg)_xR_1$, in which $R_1$ represents a radical of an alkali-metal salt of a hydroxy mono-basic carboxylic acid, which radical is linked to the $C_6H_5Hg$ group by replacement of hydrogen of the OH group; and in which $x$ represents the number of $C_6H_5Hg$ groups in the compound and is an integer of at least one and not more than the number of OH groups in said salt.

CARL N. ANDERSEN.